*INVENTOR,*
ADOLF L. HERRMANN

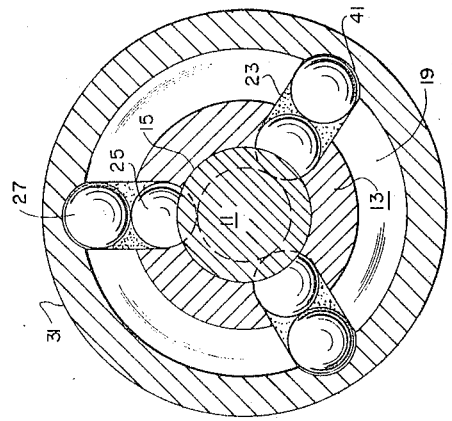
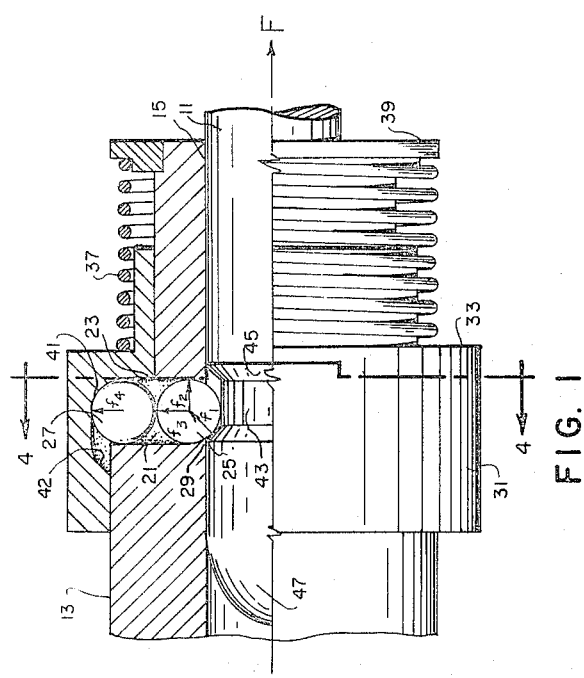

United States Patent Office 3,302,960
Patented Feb. 7, 1967

3,302,960
LOCKING DEVICE WITH ROLLING DETENTS
Adolf L. Herrmann, Huntsville, Ala., assignor to the United States of America as represented by the Administrator of the National Aeronautics and Space Administration
Filed Mar. 20, 1964, Ser. No. 353,634
8 Claims. (Cl. 287—119)

The invention described herein may be manufactured and used by or for the Government of the United States of America for governmental purposes without the payment of any royalties thereon or therefor.

This invention relates generally to devices for locking members together and particularly to a locking device which releases in response to a small unlocking force even when the locked members are subjected to high axial loads.

When it is desired to lock two members together and subsequently release them quickly or perhaps instantaneously, a ball-locking device is often selected as the most suitable type of lock. One example of a need for a lock of this nature is seen in the field of missiles and rockets where it is necessary in the launching process to lock the vehicle to its pad and release it instantly when launch thrust has been developed.

Ball-locking devices commonly have a basic mode of operation wherein one or more balls are held movably captive by one member and a portion of each ball enters a recess in the surface of a second member thereby locking the two members together. Withdrawal of the balls from the recess is prevented by engagement with a movable blocking element such as a sleeve or pin. This blocking element may have a cammed surface which engages the balls in their unlocked position and cams them into the recess, thereafter blocking their removal.

A disadvantage in the use of existing ball-locking devices arises where it is desirable or necessary, as in the case of launching a rocket, to release the lock under load conditions where, for example, one member is being pulled while locked to a permanently fixed member, or where the locked members are being pulled in opposite directions. Such loading of the locked members results in each of the locking balls being subjected to highly concentrated forces wedging each ball against surfaces of the two locked members and against the blocking element.

To release the lock when the locking balls are wedged in the manner referred to, it is necessary to slide the blocking element over the surfaces of contact with the balls since the balls cannot rotate in the wedged condition. When large loads are applied to the locked members, the friction which resists sliding between the blocking element and the balls becomes so intense that a powerful force is required to slide the blocking element to permit the balls to move out of the locked position. Thus, the particular disadvantage of present ball-locking devices is the necessity of providing this powerful releasing force, which may require a hydraulic, pneumatic, or other rather elaborate power source.

Accordingly, it is an object of this invention to provide a locking device which locks positively, releases instantly, and requires only a small unlocking force even when highly loaded.

Another object is to provide a ball-locking device which retains the advantages of existing ball-locking devices such as simplicity, economy, and quick release, but which eliminates the requirement of a substantial unlocking force to release the lock regardless of the load magnitude applied to the lock.

A further object is to provide a locking device wherein the locking and unlocking movement between parts is relatively frictionless.

Other objects, uses, and advantages of the present invention will become apparent as the description proceeds.

The invention comprises means for locking a pair of members together. One of the locked pair of members has one or more transverse apertures extending therethrough with each aperture containing first and second balls or other rounded elements such as rollers. The first ball in each aperture is adapted to move in and out of locking engagement with the other of the pair of locked members in response to the movement of a blocking element which engages the second ball. This blocking element may take the form of a movable sleeve embracing the locked apertured member, shifts the second ball into alternate locking or unlocking positions either preventing or permitting unlocking movement of the first ball. When the second ball is shifted by the blocking element into locking position, the first ball is simultaneously forced into locking position.

When the balls in their locking position are subjected to wedging forces due to loading of the locked pair of members, movement of the blocking element will cause the second ball to roll, simultaneously, over the first ball and the blocking element surface toward the unlocking position. Since frictional sliding between the moving elements is thus eliminated, the unlocking force required is minimal.

In describing the invention in detail, reference will be made to the accompanying drawing in which:

FIGURE 1 is an elevational view, partly in section, of an assembly incorporating a locking device shown in the locked position;

FIGURE 4 is a cross-sectional view taken along line 4—4 of FIGURE 1.

Figure 2:
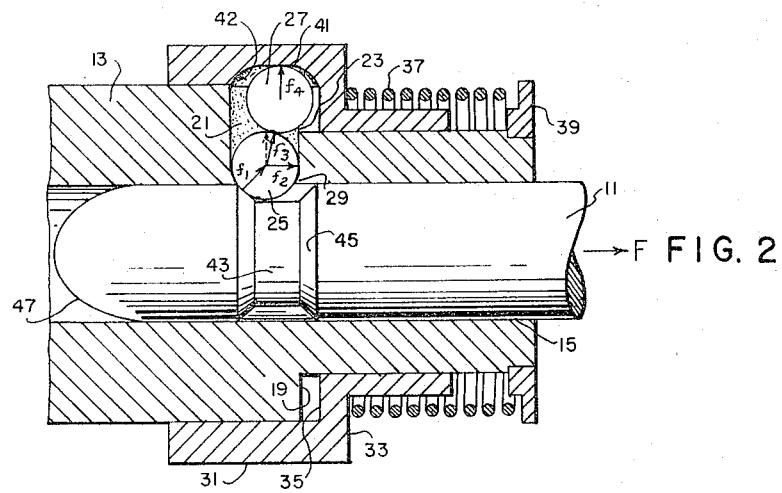
FIGURE 2 is a longitudinal cross-sectional view of FIGURE 1 showing a transistory condition occurring during the unlocking operation.

Referring now to FIGURES 1 and 2, a pair of members 11 and member 13 are shown locked together. The inner member 11 is illustrated as a solid elongated member such as a shaft or rod. The outer member 13 has an axially extending end opening 15 which receives an end portion of the member 11. The end portion of member 13 has a reduced external diameter, thereby reducing the member's wall thickness by one half and forming a circumferential shoulder 19. Transverse apertures 21 extend through the unreduced wall thickness of the member 13 adjacent the shoulder 19. The wall of each aperture 21 is open at 23 (see FIGURE 4) along the surface line of the shoulder 19 for a distance at least equal to the diameter of the aperture, the surface line of the shoulder 19 being substantially tangent to the curvature of the aperture wall.

Within each aperture 21 are rounded elements in the form of balls 25 and 27, each being of a diameter corresponding to the aperture diameter. The relationship between the diameter and length of each aperture 21 is such that when the balls are arranged side by side with their point of contact in alignment with the outer wall surface of the reduced end of member 13, as in FIGURE 1, a small portion of ball 25 protrudes from the inner end of the aperture and a like portion of ball 27 protrudes from the outer end of the aperture. The inner end of the aperture is slightly constricted at 29, preventing escapement of the balls from the aperture while permitting the desired portion of ball 25 to protrude therefrom.

A sleeve 31 is slidably disposed around the member 13 in the region of the shoulder 19 and apertures 21. Both the inside and outside diameters of sleeve 31 vary, with the inside diameter conforming to the different outside diameters of the member 13 which extend from either side of the shoulder 19. This results in a circumferential offset 33 approximately midway of the length of the sleeve 31.

The inside surface 35 of the offset 33 engages the shoulder 19 when the sleeve 31 is in the locking position, as in FIGURE 1. The sleeve 31 is biased toward the locking position by a compressed spring 37, one end of which engages the outside surface of the offset 33 while the other end engages a ring 39 provided at the end of member 13.

Arcuate recesses 41 (see FIGURES 1 and 4) having a radius corresponding generally to the radius of balls 27 are formed in the inner wall surface of the larger diameter portion of the sleeve 31. These recesses are directly opposite the respective apertures 21, and receive the protruding portions of balls 27 in a firm fit. One end wall of each recess 41 begins at the inside surface 35 of the offset 33 and the recess extends to an opposite end wall 42, a length exceeding the diameter of the balls 27 by about one third. The end walls of the recesses are curved to conform to the balls 27.

Near the end of the member 11 an annular recess 43 is provided having a depth approximately equal to the distance the balls 25 project from the apertures 21. The recess 43 has inclined walls 45 diverging from the bottom of the recess to provide a maximum recess width slightly greater than the diameter of the balls 25.

In the locking position shown in FIGURE 1, the balls 25 protrude from apertures 21 into the recess 43 of member 11, and the balls 27 likewise protrude into the recesses 41 of the sleeve 31. The member 13 may be fixed while the member 11 is axially loaded in the direction of the arrow F, subjecting each ball 25 to wedging forces indicated by $f$, $f_2$, and $f_3$. The force $f_3$ is transferred by each ball 25 to the adjacent ball 27, which in turn is forced against the sleeve 31 as indicated by $f_4$.

Figure 3:
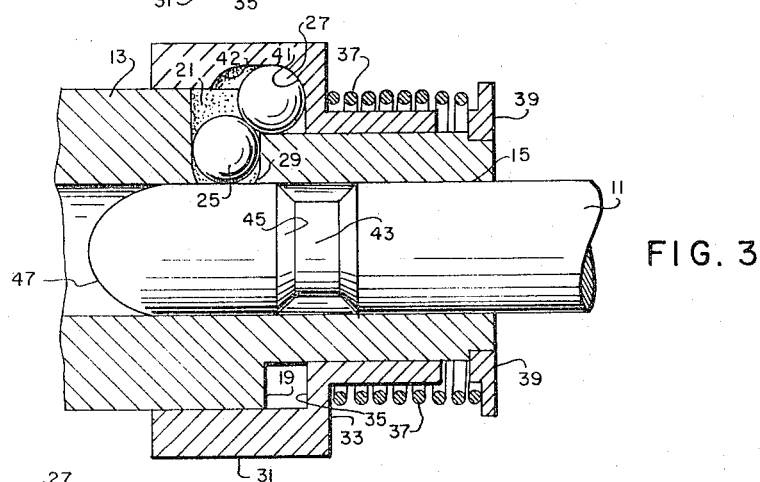
FIGURE 3 is a cross-sectional view similar to FIGURE 2, showing the locking device in the unlocked position.

Under the force conditions illustrated, movement of the sleeve 31 toward the unlocking position of FIGURE 3 will cause each ball 27 to roll clockwise over the surface of the adjacent ball 25 and over the surface of the adjacent recess 41. This change in position of the sleeve 31 and the balls 27 is indicated in FIGURE 2. The force $f_3$ transmitted from each ball 25 to ball 27 builds up as its direction moves clockwise with the rolling of ball 27 until the angle of friction between balls 25 and 27 is exceeded. At this point, each ball 27 automatically snaps against the inside surface 35 of the offset 33 permitting each ball 25 to simultaneously snap out of the recess 43 releasing the member 11 (see FIGURE 3).

Movement of the sleeve 31 to the unlocking position requires only a minimum force since no sliding occurs between the balls 25 and 27 or between the sleeve and the balls 27, except the automatic sliding of the balls at the point when the aforementioned angle of friction is exceeded.

If no load is applied to the locked members 11 and 13, and the balls 25 and 27 are free of welding forces, the balls 27 are, nevertheless, moved by the sleeve 31 out of the lateral path of the balls 25 sufficiently to permit release of the member 13. In this case, the balls 27 may not roll at all but rather the sleeve, when moved toward the unlocking position, may slide over the balls 27. However, the rounded end 42 of each recess 41 will engage the ball 27 and move it, permitting the ball 25 to shift out of the recess 43.

If the member 11 is entirely withdrawn from the member 13, one or all of the balls 25 may shift back into their locking positions and protrude into the axial opening 15 of member 13. This may be due to gravity, or if the sleeve 31 is not held in its unlocked position, the spring 37 would urge it and the balls 25 and 27 to their locking positions. Therefore, to facilitate the insertion of the member 11 into the member 13, past the protruding balls 25, a tapered end 47 is provided on the member 11. This tapered surface will engage the balls 25 and push them out of its path into the apertures 21. This operation requires that the sleeve 31 be retracted to its unlocking position so as to partially move the balls 27 out of the apertures 21. After the end of the member 11 passes the apertures 21 the sleeve 31 may be released, leaving it biased toward the locking position under the force of the spring 37. Locking will occur automatically when the recess 43 moves into lateral alignment with the balls 25.

Figure 5:
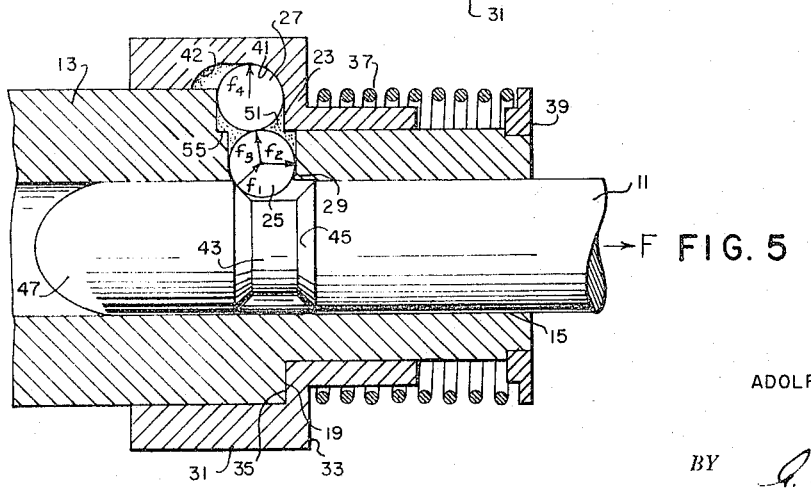
FIGURE 5 is a cross-sectional view similar to FIGURE 2, showing a modification of the invention.

FIGURE 5 illustrates a modification wherein a resistance to unlocking action of the device is provided as an addition or alternative to the resistance provided by the sring 37. An added resistance to unlocking may be desired, for instance, to guard against accidental release of the locked members due to jarring or vibration. In the modification, the outer member 13 has transverse apertures 51 therein which differ from the apertures 21 in having an offset central axis with the sidewall of the aperture also being offset at 55. Hence, the innermost cavity, which receives the ball 25 is slightly offset toward the reduced diameter portion of the member 13. This produces a diagonal alignment of the balls 25 and 27 between the bottom of recess 41 in the sleeve 33 and the bottom of recess 43 in the member 11. Under the load conditions illustrated the wedging force $f_3$ will be directed in the diagonal alignment direction of the balls 25 and 27 and will, to some degree, oppose movement of the ball 27 toward the unlocking position. This is because the ball 25 must be shifted by the ball 27 toward the bottom of the recess 43 against force $f_3$ before there will be enough room for ball 25 to roll over ball 27 to the unlocking position shown in FIGURE 3. It is evident that the distance the ball 25 must be shifted toward the bottom of recess 43 and the relative magnitude of the force $f_3$ which must be overcome depends on the amount of offset provided at 55. Therefore, a desired unlocking force necessary to move the sleeve 33 may be "built-in" the device by providing a predetermined offset at 55.

Obviously, numerous modifications and variations of the present invention are possible in the light of the above teachings. For instance, the short shifting movement of the balls 27 could be arcuate on a line concentric with respect to the member 13 rather than axially thereof. In this case a small arcuately extending recess would be provided continuous with each aperture 21 to receive each ball 27 upon a rotation of the sleeve 31, with a torsion spring being substituted for the spring 37. Likewise, in such a modification, the recesses 41 would be curved lengthwise concentrically with respect to the sleeve 31 rather than axially thereof. Thus, it is to be understood that within the scope of the appended claims the invention may be practiced otherwise than specifically described herein.

What is claimed is:
1. In a locking device:
(a) a member comprising a wall portion with an aperture extending therethrough;
(b) a pair of rounded elements disposed in abutting relationship in said aperture;
(c) a reciprocating blocking element closing one end of said aperture and engaging one of said rounded elements;

(d) the sidewall of said aperture adjacent said one rounded element having an opening of a size sufficient to admit passage of said one rounded element to permit rolling of said one rounded element over the other of said pair of rounded elements in a direction laterally of said aperture;

(e) means for preventing movement of the other of said pair of rounded elements away from abutment with said one rounded element;

(f) said lateral rolling of said one rounded element being responsive to reciprocation of said blocking element.

2. In a locking device:

(a) a member comprising a wall portion with an aperture extending therethrough;

(b) a pair of rounded elements disposed in abutting relationship in said aperture with portions thereof protruding, respectively, from opposite surfaces of said wall portion;

(c) a movable blocking element closing one end of said aperture and engaging said protruding portion of one of said rounded elements;

(d) means forcing the other of said rounded elements against said one of said rounded elements and against the aperture sidewall;

(e) the sidewall of said aperture adjacent said one rounded element having an opening of a size to permit movement of said one rounded element laterally of said aperture into said opening;

(f) said one rounded element being adapted for rolling over the surface of said other rounded element into said sidewall opening in response to movement of said movable blocking element.

3. A locking device as defined in claim 2 wherein the sidewall and the central axis of said aperture are offset in a plane substantially coincident with a point of abutment between said rounded elements, the line between the centers of said rounded elements being diagonal with respect to said central axis.

4. A locking device comprising:

(a) a pair of members constituting inner and outer members;

(b) said outer member having an opening therein receiving said inner member;

(c) the wall of said outer member around said opening having an aperture extending therethrough;

(d) first and second rounded elements disposed in abutting relationship in said aperture with portions thereof protruding, respectively, from opposite surfaces of said wall;

(e) said inner member engaging said protruding portion of said first rounded element;

(f) said outer member bearing a movable blocking element overlying said aperture;

(g) said blocking element having a recess therein receiving said protruding portion of said second rounded element;

(h) the sidewall of said aperture adjacent said second rounded element having an opening of a size sufficient to admit passage of said second rounded element to permit rolling of said second rounded element over said first rounded element in a direction laterally of said aperture;

(i) said lateral rolling of said second rounded element being responsive to movement of said blocking element.

5. A locking device as defined in claim 4 wherein said movable blocking element comprises a sleeve surrounding said outer member, said sleeve being biased against movement in one direction.

6. A ball-locking device comprising:

(a) a pair of members constituting inner and outer members;

(b) said outer member having an opening therein slidably receiving said inner member;

(c) the wall of said outer member around said opening having a plurality of apertures extending therethrough;

(d) the axis of each of said apertures extending radially and transversely from the axis of said opening;

(e) first and second balls disposed in abutting relationship in each of said apertures with portions thereof protruding, respectively, from opposite surfaces of said wall;

(f) said inner member having a recess therein receiving said protruding portion of each of said first balls;

(g) said outer member having an outer diameter which changes at a transverse plane intersecting a sidewall of said apertures thereby forming a circumferential shoulder which opens into each of said apertures exposing said second balls;

(h) each of said openings from said shoulder into said apertures extending circumferentially a distance sufficient to permit passage therethrough of said second ball;

(i) a reciprocating sleeve slidably disposed around said outer member in the region of said shoulder and overlying said apertures;

(j) said sleeve having an offset intermediate its ends engaging said shoulder;

(k) said sleeve further having circumferentially spaced recesses therein with said protruding portion of each of said second balls being received in one of said recesses;

(l) each of said recesses in said sleeve extending lengthwise from said offset a distance exceeding the diameter of said second ball disposed therein;

(m) means biasing said sleeve toward engagement between said offset and said shoulder;

(n) said second balls being adapted for shifting into said shoulder openings in response to movement of said sleeve.

7. A ball-locking device as defined in claim 6, including means urging one of said pair of members to slide relative to the other of said pair of members thereby forcing said first balls against said second balls and against the aperture sidewalls, said second balls being adapted to roll over the abutting first balls when shifting into said shoulder openings.

8. A locking device comprising:

(a) a pair of adjacent members;

(b) one of said pair of members having a wall portion with an operture extending therethrough;

(c) first and second rounded elements disposed in abutting relationship in said aperture with portions thereof protruding, respectively, from opposite surfaces of said wall portion;

(d) the other of said pair of members having a recess therein receiving said protruding portion of said first rounded element;

(e) said wall portion being of a different thickness on opposite sides of a transverse plane intersecting a sidewall of said aperture thereby forming a shoulder which opens into said aperture exposing said second rounded element;

(f) said opening from said shoulder into said aperture being sufficiently large to permit passage therethrough of said second rounded element;

(g) a movable blocking element carried by said wall portion overlying said shoulder and aperture and engaging said protruding portion of said second rounded element;

(h) said blocking element having an offset intermediate its ends bearing on said shoulder;

(i) means biasing said offset against said shoulder;

(j) said second rounded element being adapted for rolling over the first rounded element into said shoulder opening in response to movement of said blocking element.

References Cited by the Examiner

UNITED STATES PATENTS

| | | | |
|---|---|---|---|
| 2,138,940 | 12/1938 | Robinson | 285—277 |
| 2,238,583 | 4/1941 | Dodge. | |
| 2,297,548 | 9/1942 | Fox et al. | 285—277 |
| 2,599,003 | 6/1952 | Leonard | 285—374 X |
| 2,970,844 | 2/1961 | Better | 279—75 |
| 3,001,752 | 11/1961 | Geffner. | |

FOREIGN PATENTS

| | | |
|---|---|---|
| 915,371 | 7/1946 | France. |
| 575,355 | 2/1946 | Great Britain. |

CARL W. TOMLIN, *Primary Examiner.*

D. W. AROLA, *Assistant Examiner.*